United States Patent [19]

Czarnocki

[11] Patent Number: 5,027,015

[45] Date of Patent: Jun. 25, 1991

[54] NON-LINEAR CONVERSION OF INPUT FROM A SENSOR TO AN OUTPUT WITH TWO DIFFERENT SLOPES

[75] Inventor: Walter Czarnocki, Schaumburg, Ill.

[73] Assignee: Motorola, Inc., Schaumburg, Ill.

[21] Appl. No.: 407,396

[22] Filed: Sep. 14, 1989

[51] Int. Cl.$^5$ .......................... G06G 7/10; H03K 3/26
[52] U.S. Cl. .................... 307/491; 328/142; 328/307
[58] Field of Search .............. 307/517, 308, 309, 118, 307/310, 263, 491; 328/165, 1, 142, 185

[56] References Cited

U.S. PATENT DOCUMENTS

| | | | |
|---|---|---|---|
| 3,341,654 | 9/1967 | Pay et al. | 328/142 |
| 3,436,559 | 4/1969 | Wajs | 328/142 |
| 3,535,549 | 10/1970 | Herrero | 328/142 |
| 3,831,111 | 8/1974 | Lafferty | 331/116 R |
| 3,970,966 | 7/1976 | Keller et al. | 331/116 R |
| 4,104,997 | 8/1978 | Pagitt | 123/117 R |
| 4,107,629 | 8/1978 | Stone | 331/116 R |
| 4,254,382 | 3/1981 | Keller et al. | 331/116 R |
| 4,385,611 | 5/1983 | Harper et al. | 123/480 |
| 4,914,387 | 4/1990 | Santos | 307/309 |
| 4,947,057 | 8/1990 | Czarnocki et al. | 307/310 |

OTHER PUBLICATIONS

Peter Harper Circuit Drawings Dated 9/11/89.

*Primary Examiner*—Stanley D. Miller
*Assistant Examiner*—Richard Roseen
*Attorney, Agent, or Firm*—Phillip H. Melamed

[57] ABSTRACT

Pressure sensor circuit (12) develops an input sensor signal (V01) varying linearly as a function of sensed pressure (P) over a range ($P_1$) of pressure. An error reduction circuit (14–21, R10–R14) having operational amplifiers (16, 19) and a semiconductor device (21) receives the input sensor signal and provides an output signal ($V_{OUT}$). The output signal varies at a first high constant rate during a first portion ($P_2$) of the pressure range and at a lower constant rate during a second portion ($P_3$) of the pressure range. A break point (BP) between the first and second pressure range portions occurs when the input sensor signal magnitude exceeds a voltage level ($V_T$) magnitude. The rate of change of the output signal during the first pressure range portion exceeds the rate of change of the input sensor signal during this same pressure range and thus the percentage of error of the output signal is less during the first pressure range portion than the percentage of error of the input sensor signal. The break point and rates of change of the output signal are substantially temperature independent and each can be independently adjusted.

20 Claims, 1 Drawing Sheet

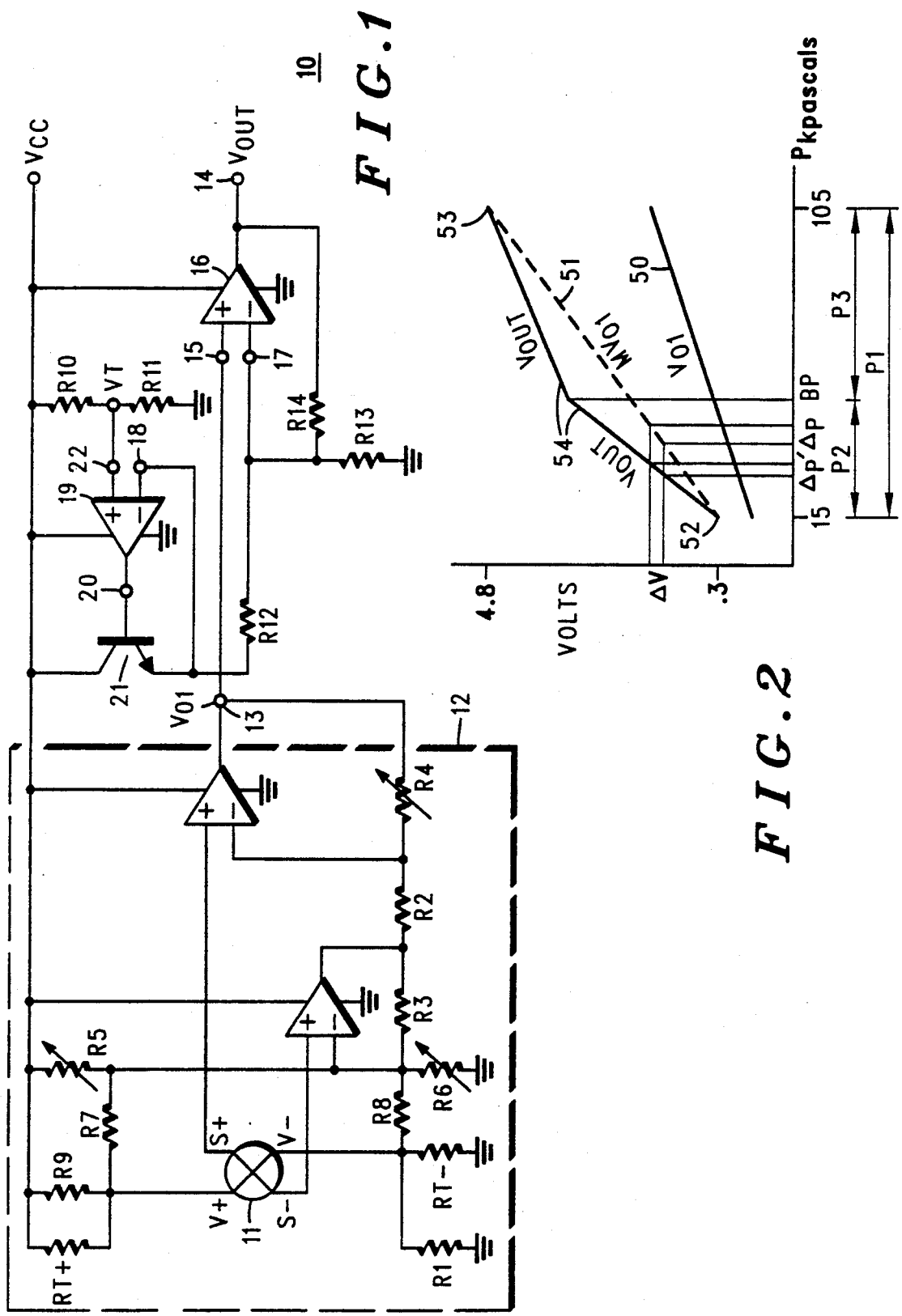

NON-LINEAR CONVERSION OF INPUT FROM A SENSOR TO AN OUTPUT WITH TWO DIFFERENT SLOPES

BACKGROUND OF THE INVENTION

The invention relates generally to the field of circuits in which a signal is provided which varies in a known manner in accordance with a sensed variable. More particularly, the present invention relates to a percentage error reduction circuit which has been used with a pressure sensor input signal representative of sensed pressure to provide an output signal having less percentage error as a function of sensed pressure.

Generally, prior sensor circuits sense a variable and produce an electrical signal having a magnitude representative of the sensed variable. Typically, this electrical signal is temperature compensated so as to minimize undesired temperature variations which may occur in either the sensor itself or the subsequent circuitry which processes the output of the sensor. Generally, it is desired to have the output signal vary linearly as a function of the sensed variable, and some prior sensor circuits have been able to implement such a relationship. However, when such prior circuits have been successful in providing a substantially linear variation of the output signal as a function of the sensed variable over a substantial range of magnitude of the sensed variable, this means that the percentage of error, or uncertainty with regard to the magnitudes of the sensed variable, is relatively high at the lower range of the sensed variable as compared to the upper range of the sensed variable. This is because the percentage of error is a function of the magnitude of the sensed variable and therefore automatically decreases as the absolute value of the sensed variable increases. Thus even though some prior circuits have been successful in providing an output signal that varies substantially linearly as a function of a sensed variable over a substantial range of variable magnitudes, the circuits produce the undesirable result of having a relatively large percentage of error at the lower portion of the range of the sensed variable as compared to a much smaller percentage of error at the higher range of the sensed variable.

Some prior circuits for processing a sensor signal have provided an output signal which varies differently with regard to the sensed variable for different ranges of the sensed variable. Typically such circuits are implemented by utilizing circuitry in which the break point between each rate change for the output signal is determined by the turn on threshold of a semiconductor device, such as a diode, which threshold is substantially temperature dependent. Such circuits are therefore inherently inaccurate or have to utilize extensive temperature compensation circuits to achieve any degree of accuracy since the occurrence of the rate change break points are very susceptible to temperature variations. Also, typically the circuitry utilized to implement prior rate change break points resulted in any change in the break point also substantially affecting the magnitude of the rate to be implemented. Thus these prior circuits required a number of iterative adjustments to achieve a final desired result since any break point adjustment also then required a rate magnitude adjustment.

SUMMARY OF THE INVENTION

An object of the present invention is to provide an improved error reduction circuit in which the deficiencies of the prior art circuits noted above have been overcome.

A more particular object of the present invention is to provide an improved percentage error reduction circuit in which a linearly varying sensor signal is processed to provide an output signal having a lower percentage of error for an initial low range of sensed variable magnitudes than would have been provided by the input sensor signal.

Another object of the present invention is to provide an improved circuit for controlling the break points and rate changes for a signal varying as a function of a sensed variable.

In one embodiment of the present invention a percentage error reduction circuit, adaptable for use in a pressure sensor circuit, is provided. The error reduction circuit includes a circuit for providing an input sensor signal varying as a known function of a sensed variable over a predetermined range of sensed variable magnitudes; and a circuit which receives the input sensor signal, nonlinearly processes it and provides a corresponding output signal varying as a function of the sensed variable at a first rate during a first low portion of the predetermined range of sensed variable magnitudes and at a second rate, less than the first rate, during a subsequent second higher portion of the range, the first rate of the output signal exceeding the rate of change of the input sensor signal as a function of the sensed variable during the first portion of the range.

Essentially, the error reduction circuit noted above takes the input sensor signal, which varies over a predetermined range of sensed variable magnitudes and divides the range into at least 2 subranges. The output signal in the lower of these ranges varies at a faster rate as a function of the sensed variable than the input signal. This results in reducing the percentage of error of the resultant output signal. More specifically, a pair of operational amplifiers and a semiconductor device are configured so as to implement a substantially temperature independent circuit which takes the input sensor signal, which may be a substantially linearly varying signal as a function of the sensed variable, and provides a multiple slope output signal with the slope of the output signal during the first portion of the range varying at a higher rate than the variation of the input sensor signal during this same first portion of the range. This results in reducing the percentage of error of the output signal with regard to the sensed variable. The specific circuitry utilized for the percentage error reduction circuit can also be used to provide an improved temperature independent and readily rate (slope) adjustable processing circuit for any sensor input signal. This is true even though the present invention is particularly described in the context of processing a substantially linearly varying pressure sensor signal to achieve a reduction in percentage of error for a low pressure range.

Additional features and advantages of the present invention can be better understood by reference to the subsequent more detailed description of the invention.

BRIEF DESCRIPTION OF THE DRAWINGS

For a more complete understanding of the invention reference should be made to the drawings, in which:

FIG. 1 is an electrical schematic of a pressure sensor circuit constructed in accordance with the present invention; and FIG. 2 is a graph illustrating the relationship between sensed pressure and various electrical signals implemented by the circuit in FIG. 1.

DESCRIPTION OF THE PREFERRED EMBODIMENTS

Referring now to FIG. 1, a pressure sensor circuit 10 is illustrated. Pressure P is preferably sensed by a piezoresistive transducer element 11 contained in an input sensor signal circuit 12 which provides an input sensor signal VO1 at an output terminal 13. The internal configuration of the input sensor signal circuit 12 is shown in FIG. 1 and essentially comprises a pair of operational amplifiers and temperature independent resistors as well as a pair of opposite temperature coefficient temperature variable resistors RT+ and RT−. The specific configuration for the circuit 12 illustrated in FIG. 1 is not significant with regard to the essential elements of the circuit 10 which will implement an effective error reduction for the signal VO1 at the terminal 13. However, preferably the signal VO1, provided by the circuit 12 at the terminal 13, will vary substantially linearly as a function of sensed pressure over an appreciable range of sensed pressure, such as over the range P1 comprising 15 to 105 kilopascals. Adjustment of components in the circuit 12 adjusts signal gain and offset for the signal VO1 so as to control signal gain and offset for a desired final resultant output signal $V_{out}$ provided by the circuit 10 at a terminal 14.

Referring to FIG. 2, a graph 50 illustrates the transfer characteristic for sensed pressure P and the input sensor signal VO1 at the terminal 13. This transfer characteristic illustrates that the signal VO1 varies substantially linearly over the range P1 of sensed pressure. FIG. 2 also illustrates a graph 51, shown dashed, which represents the transfer characteristic for a signal MVO1 which corresponds to the signal VO1 multiplied by a fixed constant gain factor M. The signal MVO1 linearly varies over the pressure range P1 between desired voltage end points 52 and 53. The signal MVO1 represents the type of single slope output signal which would have been provided by prior art circuits so as to provide a pressure output signal varying between the specified end points 52 and 53.

For any voltage magnitude for MVO1 there exists some error such as the error delta v ($\Delta v$) shown in FIG. 2. This results in a corresponding pressure magnitude uncertainty delta p ($\Delta p$) as shown in FIG. 2. While the magnitude of this pressure uncertainty delta p remains the same for signal MVO1 throughout the pressure range P1, the percentage of error, defined as delta p divided by the magnitude of the pressure P, changes substantially over the pressure range P1. This results in a relatively high percentage of error during a lower portion P2 of the pressure range P1 as compared to a relatively lower percentage of error during an adjacent higher portion P3 of the pressure range. The signal VO1 at terminal 13 has the same problem. This result is typically undesirable but is inherent when a substantially linear transfer characteristic is provided for the signal MVO1 over the range P1.

The present invention proposes to overcome the above noted problem by essentially dividing the overall pressure range P1 (15 to 105 kilopascals) into at least 2 pressure subrange portions and implementing different effective signal gains for each pressure subrange. A pressure range portion P2 exists from 15 kilopascals to a break point pressure magnitude BP and a pressure range portion P3 exists from BP to 105 kilopascals. During the lower pressure range P2, a voltage Vout, shown by the solid transfer characteristic 54 in FIG. 2, will have a higher (than MVO1 or VO1) fixed rate of change of voltage as a function of sensed pressure. For the pressure range P3, the rate of change of $V_{out}$ as a function of sensed pressure will also be fixed, but less than the rate of change of $V_{out}$ in the subrange P2. This will result in effectively reducing the $V_{out}$ percentage of error, as compared to the MVO1 percentage error, for the range P2, while still having the signal $V_{out}$ vary between the specified end points 52 and 53. The $V_{out}$ percentage of error for range P3 will be slightly higher than the corresponding $MV_{O1}$ percentage error. However, the maximum percentage error for $V_{out}$ over the overall range P1 will be substantially less than the maximum percentage of error for MVO1 over the range P1 (which would occur at the beginning of range P1). Thus a reduction in maximum percentage of error over range P1 is achieved by the signal $V_{out}$ as compared to signal MVO1. Preferably the magnitudes of the components in circuit 10 are selected to control the $V_{out}$ breakpoint BP and the slopes of the characteristic 54 such that the maximum $V_{out}$ percentage of error in range P2 will be approximately the same as the maximum $V_{out}$ percentage of error for range P3.

As can be seen from FIG. 2, for the $V_{out}$ transfer characteristic 54, now the voltage uncertainty delta v in portion P2, which previously resulted in a pressure uncertainty delta p, now results in a smaller pressure uncertainty delta p′. This illustrates a reduction in the percentage of error for range P2 achieved by the circuit 10. This is primarily because the fixed constant rate of change for $V_{out}$ during pressure range P2 is higher than the fixed constant rate of change for the signal MVO1 during P2. An equivalent result can not be achieved by just increasing the fixed gain factor M, since if that were done the resultant single slope transfer characteristic for MVO1 would not fit between the voltage end points 52 and 53 over the range P1. The manner in which the circuit 10 implements a reduction in percentage of error will now be discussed.

The terminal 13 at which the substantially linearly varying signal VO1 is provided is directly connected to a terminal 15 corresponding to the noninverting input of a first operational amplifier 16 whose output is directly connected to the output terminal 14. A resistor R14 provides a feed back path from the output terminal 14 to the inverting input terminal 17 of the first operational amplifier. A resistor R13 connects the terminal 17 to a fixed reference potential comprising ground. The terminal 17 is connected through a resistor R12 to the inverting input terminal 18 of a second operational amplifier 19 that provides an output at a terminal 20 corresponding to a base (control) electrode of an NPN transistor 21 having its collector electrode connected to a regulated source of DC voltage at a terminal $V_{cc}$ and its emitter (output) electrode connected to the terminal 18. A resistor R10 is connected between the terminal $V_{cc}$ and a terminal 22 corresponding to the noninverting input of the operational amplifier 19, and the terminal 22 is connected to ground potential through a resistor R11. In addition, each of the operational amplifiers shown in FIG. 1, as is understood, contains additional connections to the regulated DC power supply terminal $V_{cc}$ and ground potential. The operation of the above noted circuitry is as follows.

Essentially both of the operational amplifiers 16 and 19 function such that when these amplifiers are operative the input signals at the inverting and noninverting input terminals are identical due to the high open loop again of the amplifier and the providing of a feed back path to the inverting terminal of the amplifier. It should also be noted that each of the inputs to the operational amplifiers are high impedance connections. The resistors R10 and R11 essentially establish a fixed reference threshold voltage VT at the noninverting input terminal 22 of the operational amplifier 19. This voltage VT essentially establishes a voltage threshold which determines the break point BP at which the transfer characteristic of the output voltage $V_{OUT}$ changes slope per the characteristic shown in FIG. 2. This is achieved by the effective nonlinear processing of the input signal VO1 which is implemented in the following manner.

When the input signal VO1 at the terminal 13 has a magnitude which exceeds the threshold voltage VT, the operation of the circuit 10 is as follows. The signal VO1 at the terminal 13 is provided to the noninverting input terminal of the operational amplifier 16. The high gain operational amplifier produces a corresponding signal VOUT at the terminal 14, and part of this output is fed back to the inverting input terminal 17 via the action of the resistor divider comprising resistors R13 and R14. The effect is that signal at the inverting input terminal 17 is also essentially equal to the signal V01. This results in the signal at the emitter of the transistor 21 being at the potential V01 as well as the signal at the input terminal 18 of the operational amplifier 19. The end result is that the transistor 21 is off such that this transistor and the resistor R12 essentially form a turned off current source when the signal VO1 exceeds the reference threshold voltage VT. For this condition, the signal $V_{OUT}$ at the terminal 14 will directly correspond to the signal VO1 except it will be multiplied by the gain of the operational amplifier stage which includes the operational amplifier 16. The gain of this stage, because of the high open loop gain of operational amplifier 16, will be approximately one plus the ratio of the resistor R14 to resistor R13.

When the input signal voltage VO1 is less than the threshold level VT, again the voltage at the terminal 18 and the emitter of the transistor 21 will initially correspond to VO1. However, now the operational amplifier 19 will provide an output signal at the terminal 20 so as to turn on the transistor 21 such that this transistor and the resistor R12 form a current source to provide an additional current signal input at terminal 17. This results in increasing the gain of the operational amplifier stage which includes amplifier 16 by a fixed predetermined amount determined primarily by the magnitude of the resistor 12 such that a different transfer slope for the signal $V_{OUT}$ is now implemented for the lower pressure range P2. The rate of change (slope) of the $V_{out}$ transfer characteristic 54 during the range portion P3 is less than the rate of change (slope) during the range portion P2 and for the circuit 10 these rates of change are constant. Thus $V_{out}$ varies in a piecewise linear manner as a function of pressure P.

Essentially, the break point BP of the transfer characteristic for the signal $V_{OUT}$ shown in FIG. 2 is determined by the predetermined voltage VT. The break point is implemented for the signal $V_{OUT}$ when the voltage VO1 has a magnitude that exceeds the voltage VT. The specific configuration of the operational amplifiers 16 and 19 and the semiconductor transistor 21 results in essentially no temperature dependence for the break point BP. This is because the break point BP depends on the voltage $V_T$ which is determined by the substantially temperature independent resistors R10 and R11. This is because the turning on of the transistor 21 is controlled by the operational amplifier 19 and is not substantially dependent upon the base emitter turn on threshold of the transistor 21. This occurs because the amplifier 19 has a large open loop gain and will always produce a sufficient amount of voltage to turn on the transistor 21 when the voltage at the terminal 18 is less than the voltage at the terminal 22. In addition, it should be noted that the setting of the break point by determining the voltage VT is implemented for the circuit 10 by adjustment of the resistors R10 and R11. This adjustment does not substantially influence the slope of the characteristic 54 in the P2 and P3 pressure ranges implemented by the present circuit. This slope for pressure range P2 is primarily dependent upon the magnitude of the resistor R12. For range P3, the slope is determined by R13 and R14. Thus the present invention can separately adjust the break point BP and the slope of the characteristic 54 for the pressure ranges P2 and P3.

Based on the above description of the circuit 10, it is apparent that the circuit 10 implements a percentage error reduction circuit in which the signal $V_{OUT}$ has less of a percentage error for at least the lower pressure range P2 than the signals MVO1 and VO1 had for this same pressure range. This is because the rate of change of the signal $V_{OUT}$ during the pressure range P2 is higher than the corresponding rate of change for the signals MVO1 and VO1 during this pressure range. In addition, it is apparent that additional break points for the transfer characteristic for the signal $V_{OUT}$ can be implemented by adding additional stages, corresponding to the resistors R10 and R11, the operational amplifier 19 and the transistor 21 and resistor R12, to the circuit shown in FIG. 1. Again, each of the break points for each added stage can be separately adjusted and the break points are substantially temperature independent due to the particular circuit configuration which is utilized. This circuit configuration can also be utilized any time it is desired to provide a piecewise linear transfer characteristic for an output signal as a function of a sensed variable. This circuit configuration can also be used any time it is desired to set up a transfer curve temperature independent break point for implementing different rate changes for ranges above and below the break point.

While I have shown and described specific embodiments of this inventions, further modifications and improvements will occur to those skilled in the art. All such modifications which retain the basic principals disclosed and claimed herein are within the scope of this invention.

I claim:

1. A percentage error reduction circuit, adaptable for use in a pressure sensor circuit, comprising:

means for providing an input sensor signal varying as a predetermined function of a sensed variable over a predetermined range of sensed variable magnitudes; and circuit means coupled to said input sensor signal providing means for providing, in response to nonlinearly processing said input sensor signal, a corresponding output signal varying as a function of said sensed variable at a first rate during a first low portion of said range and at a second rate, less than said first rate, during a subsequent second higher portion of said range, said first rate of said output signal exceeding the rate of change of said input sensor signal as a function of said variable during said first portion of said range.

2. A circuit according to claim 1 wherein said first and second rates are constant rates determined by said circuit means.

3. A circuit according to claim 2 wherein said first and second portions of said range are adjacent to each other.

4. A circuit according to claim 3 wherein said circuit means includes circuitry for determining the break point defining the boundary between said initial and subsequent portions of said range, said break point corresponding to a predetermined magnitude of said variable, said break point implemented by the magnitude of said input sensor signal exceeding a predetermined level determined by said circuitry.

5. A circuit according to claim 1 wherein said circuit means comprises a first operational amplifier having one input which directly receives said input signal as an input and provides said output signal as an output, and wherein said circuit means includes a feed back path from the output of said first operational amplifier to another input of said first operational amplifier, said another input also being coupled to a terminal of a semiconductor device, the voltage at said semiconductor device terminal and an additional terminal of said semiconductor device determining if said semiconductor device is operative to provide an input signal to said another input of said first operational amplifier.

6. A circuit according to claim 5 wherein said semiconductor device comprises a transistor and said terminal comprises an output terminal of said transistor and said additional terminal comprises a control terminal of said transistor.

7. A circuit according to claim 6 wherein said control terminal of said transistor is coupled to the output of a second operational amplifier having one input thereto determined by a resistor divider network coupled thereto and another input coupled to said output terminal of said transistor.

8. A circuit according to claim 7 wherein said output terminal of said transistor is coupled through a resistor to a terminal corresponding to said input of the first operational amplifier.

9. A circuit according to claim 8 wherein said feed back path comprises a resistor coupled from the output of said first operational amplifier to said input terminal, said input terminal also connected to a fixed source of voltage potential through a resistor.

10. A percentage error reduction circuit, adaptable for use in a pressure sensor circuit, comprising:
means for providing an input sensor signal varying substantially linearly as a function of a sensed variable over a predetermined range of sensed variable magnitudes; and
circuit means coupled to said input sensor signal providing means for providing, in response to nonlinearly processing said input sensor signal, a corresponding output signal varying as a function of said sensed variable at a first rate during a first low portion of said range and at a second rate, less than said first rate, during a subsequent second higher portion of said range, said first rate of said output signal exceeding the rate of change of said input sensor signal as a function of said variable during said first portion of said range.

11. A circuit according to claim 10 wherein said first and second rates are constant rates determined by said circuit means causing said output signal to vary linearly as function of said sensed variable in each of said portions of said range.

12. A circuit according to claim 11 wherein said first and second portions of said range are adjacent to each other.

13. A circuit according to claim 12 wherein said circuit means includes circuitry for determining the break point defining the boundary between said initial and subsequent portions of said range, said break point corresponding to a predetermined magnitude of said variable, said break point implemented by the magnitude of said input sensor signal exceeding a predetermined level determined by said circuitry.

14. A circuit according to claim 10 wherein said circuit means comprises a first operational amplifier having one input which directly receives said input signal as an input and provides said output signal as an output, and wherein said circuit means includes a feed back path from the output of said first operational amplifier to another input of said first operational amplifier, said another input also being coupled to a terminal of a semiconductor device, the voltage at said semiconductor device terminal and an additional terminal of said semiconductor device determining if said semiconductor device is operative to provide an input signal to said another input of said first operational amplifier.

15. A circuit according to claim 14 wherein said semiconductor device comprises a transistor and said terminal comprises an output terminal of said transistor and said additional terminal comprises a control terminal of said transistor.

16. A circuit according to claim 15 wherein said control terminal of said transistor is coupled to the output of a second operational amplifier having one input thereto determined by a resistor divider network coupled thereto and another input coupled to said output terminal of said transistor.

17. A circuit according to claim 16 wherein said output terminal of said transistor is coupled through a resistor to a terminal corresponding to said input of the first operational amplifier.

18. A circuit according to claim 17 wherein said feed back path comprises a resistor coupled from the output of said first operational amplifier to said input terminal, said input terminal also connected to a fixed source of voltage potential through a resistor.

19. A circuit for controlling break point and rate changes for a signal varying in accordance with a sensed variable over a range of sensed variable magnitudes, comprising:
means for providing an input sensor signal varying as a predetermined function of a sensed variable over a predetermined range of sensed variable magnitudes; and
circuit means coupled to said input sensor signal providing means for providing, in response to nonlinearly processing said input sensor signal, a corresponding output signal varying as a function of said sensed variable at a first rate during a first low portion of said range and at a second rate, during a subsequent second higher portion of said range;
wherein said first and second portions of said range are adjacent each other;

wherein said circuit means includes circuitry for determining the break point defining the boundary between said initial and subsequent portions of said range, said break point corresponding to a predetermined magnitude of said variable, said break point implemented by the magnitude of said input sensor signal exceeding a predetermined level determined by said circuitry; and wherein said circuit means comprises a first operational amplifier having one input which directly receives said input signal as an input and provides said output signal as an output, and wherein said circuit means includes a feed back path from the output of said first operational amplifier to another input of said first operational amplifier, said another input also being coupled to a terminal of a semiconductor device, the voltage at said semiconductor device terminal and an additional terminal of said semiconductor device determining if said semiconductor device is operative to provide an input signal to said another input of said first operational amplifier, wherein said semiconductor device comprises a transistor, said terminal of said semiconductor device comprises an output terminal of said transistor, and said additional terminal of said semiconductor device comprises a control terminal of said transistor; and wherein said control terminal of said transistor is coupled to the output of a second operational amplifier having one input thereto determined by a reference voltage coupled thereto and having another input coupled to said output terminal of said transistor.

20. A circuit according to claim 19 wherein said output terminal of said transistor is coupled through a resistor to a terminal corresponding to said input of the first operational amplifier, and wherein said feed back path comprises a resistor coupled from the output of said first operational amplifier to said input terminal, said input terminal also connected to a fixed source of voltage potential through a resistor.

* * * * *